(12) United States Patent
Sims, III et al.

(10) Patent No.: US 8,754,804 B1
(45) Date of Patent: Jun. 17, 2014

(54) ADAPTABLE TRANSPONDER FOR MULTIPLE TELEMETRY SYSTEMS

(75) Inventors: William Herbert Sims, III, New Market, AL (US); Kosta A. Varnavas, Madison, AL (US)

(73) Assignee: The United States of America as Represented by the Administrator of the National Aeronautics and Space Administration, Washington, DC (US)

( * ) Notice: Subject to any disclaimer, the term of this patent is extended or adjusted under 35 U.S.C. 154(b) by 387 days.

(21) Appl. No.: 13/369,704

(22) Filed: Feb. 9, 2012

(51) Int. Cl.
*G01S 13/08* (2006.01)

(52) U.S. Cl.
USPC .......................................................... 342/50

(58) Field of Classification Search
CPC ....................................................... G01S 13/74
USPC ..................................................... 342/42–51
See application file for complete search history.

(56) References Cited

U.S. PATENT DOCUMENTS

2005/0012653 A1* 1/2005 Heide et al. .................... 342/42

* cited by examiner

*Primary Examiner* — Timothy A Brainard
(74) *Attorney, Agent, or Firm* — Absolute Technology Law Group, LLC; James J. McGroary

(57) ABSTRACT

The present invention is a stackable telemetry circuit board for use in telemetry systems for satellites and other purposes. The present invention incorporates previously-qualified interchangeable circuit boards, or "decks," that perform functions such as power, signal receiving and transmission, and processing. Each deck is adapted to serve a range of telemetry applications. This provides flexibility in the construction of the stackable telemetry circuit board and significantly reduces the cost and time necessary to develop a telemetry system.

33 Claims, 6 Drawing Sheets

ADAPTABLE TRANSPONDER FOR MULTIPLE TELEMETRY SYSTEMS

FEDERAL RESEARCH STATEMENT

The invention described herein was made by employees of the United States Government and may be manufactured and used by or for the Government of the United States of America for governmental purposes without the payment of any royalties thereon or therefore.

FIELD OF INVENTION

The present invention relates to the field of satellite telemetry systems, and more specifically to a modularly designed transponder device that can be rapidly configured for use with any telemetry system.

BACKGROUND

Figure 1:
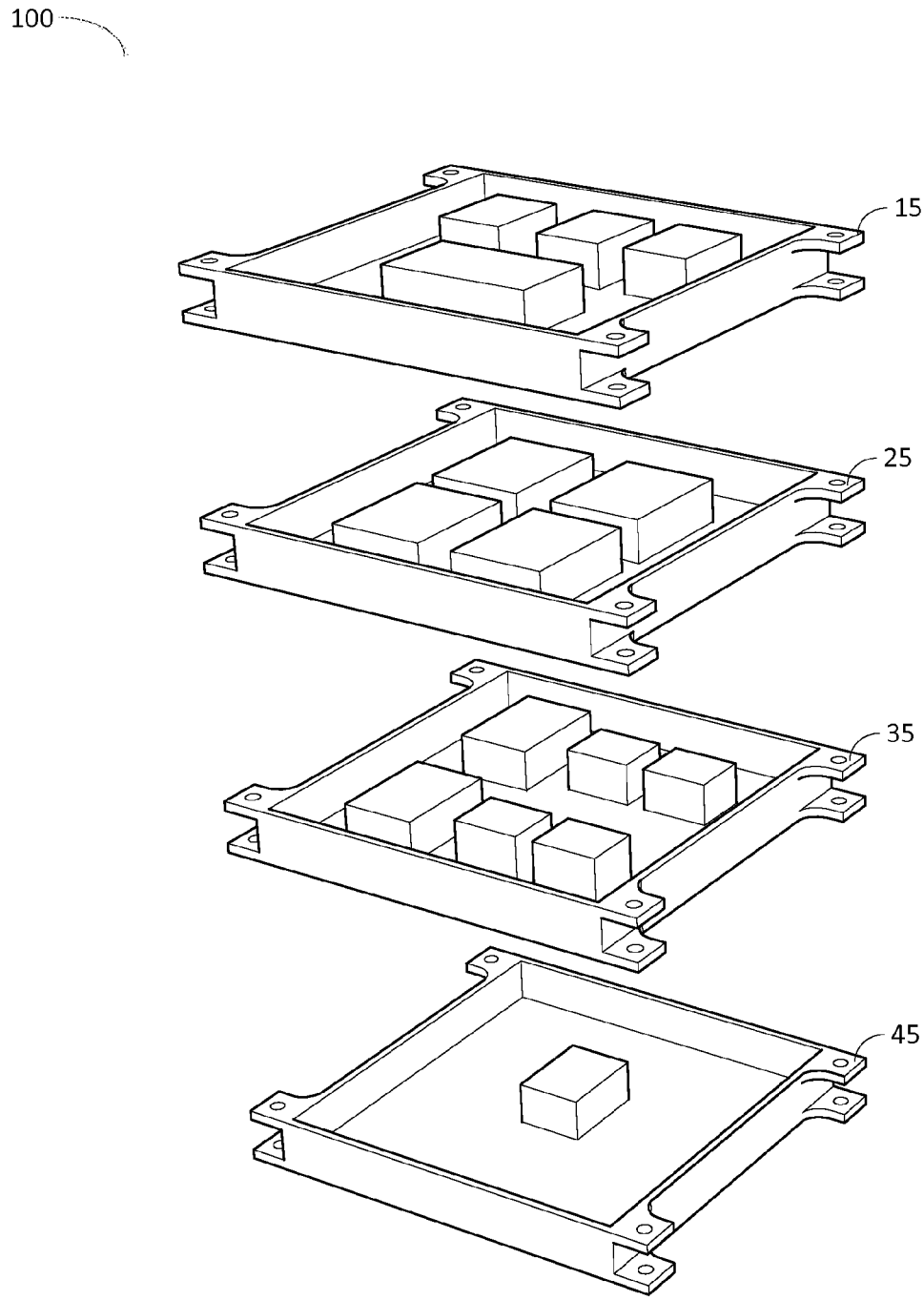
FIG. 1 illustrates an isometric view of exemplary embodiment of a stackable telemetry circuit board apparatus.

Telemetry refers to the technology used by remote sources such as space vehicles to measure and transmit data to ground-based receiving stations, and vice versa. Within a telemetry system, the transponder is a critical device which picks up and automatically responds to an incoming signal. A transponder contains the processing capability, including error checking functions, to ensure the reliability of the data.

With the associated hardware necessary for a satellite to interface with the transponder, a typical NASA telemetry system costs $5 to $10 million dollars per satellite.

A primary cost associated with development and customization of transponders and telemetry systems is the configuration and development of error checking components. Specific error checking protocols are required for various telemetry applications. Error checking is a "modular function," that is carried out independently of other processing activities.

All error checking protocols must comply with Ground Network and Consultative Committee for Space Data System (CCSDS) protocols which are required for each telemetry application.

Because both error checking functions and CCSDS protocols are modular, hardware and software for error checking theoretically may be inserted or removed from the data stream telemetry requirements.

Examples of current telemetry system error checking protocols include Reed Solomon (forward error correction), BCH (error detection only), Pseudo-Randomization (required for operation), turbo codes, convolutional code (1/2, 7/8), Virterbi, auto-ranging, encryption, and cyclic redundancy check (CRC).

An additional problem known in the art is the need for strict quality control protocols or "prequalification" of each component used by NASA. The qualification process is extremely costly and generally requires that a new device be tested in a NASA lab or have been previously used in flight. Components meeting this standard are referred to, in the art, as "prequalified" devices.

The qualification process limits the availability of transponders designed to interface with rapidly evolving and diverse telemetry systems including lunar missions and missions to Mars, military intelligence, wireless internet, cellular telephones, climate change studies, and emergency services such as fire, ambulance and police.

SUMMARY OF THE INVENTION

The present invention is a novel, modularly constructed telemetry transponder apparatus and system comprised of discrete and interchangeable decks which house telemetry components. The various interchangeable decks are comprised entirely of prequalified components, allowing a functional transponder to be specifically configured for a range of telemetry systems on a time-sensitive and low-cost basis.

In various embodiments the transponder may include modularly interchangeable telemetry receiver decks, transmitter decks, processor decks and power supply decks configured to be compatible with various telemetry systems. In particular, various embodiments will utilize interchangeable processing decks with specific FEC protocols needed for fully compatible upload and download capability for a wide range systems.

Terms of Art

As used herein, the term "Command and Data Handling" or "C&DH" means a system that receives and executes commands; collects, stores, and transmits house-keeping data; and supports the onboard payloads.

As used herein, the term "Costas loop" means a software configuration implemented on a hardware processing component that is a phase-locked loop which is used for carrier phase recovery from suppressed-carrier modulation signals.

As used herein, the term "deck" refers to a structure for mounting a circuit board and integrated components, which further may allow one or more circuit boards and associate components to be operatively coupled, thus integrating functionality. A deck may house components which relate to a specific functionality, and may further be used to physically position processing components so that they can be physically replaced or interchanged without requiring an entirely new processor to be configured. In particular, a deck may be used to house multiple prequalified parts, and the deck may be qualified in its entirety.

As used herein, the term "down converter" means a circuit which converts a signal that is received at one frequency to another frequency.

As used herein, the term "downlink component" refers to any components, including but not limited to filters, synchronizers, error-checking processing components, general packet processing components, or any other components that or facilitate the communication from flight computer (e.g., a satellite) to a ground computer.

As used herein, the term "EMI filter" refers to an electromagnetic interference filter which filters disturbances that affect electrical circuits due to either electromagnetic induction or electromagnetic radiation.

As used herein, the term "error checking" protocol means any error checking protocol that is compliant with CCDS or equivalent standards. Example of error checking protocols include, but are not limited to Reed Solomon (forward error correction), BCH (error detection only), Pseudo-Randomization (required for operation), turbo codes, convolutional code (rates ½ and ⅞), Virterbi, auto-ranging, encryption, and cyclic redundancy check (CRC).

As used herein, the term "Field-Programmable Gate Array" or "FPGA" means an integrated circuit that can be programmed after manufacturing to perform the functions of an application specific integrated circuit (ASIC).

As used herein, the term "Forward Error Correcting protocol" or "FEC" means a system of error control for data transmission wherein the sending system adds systematically-generated redundant data to its messages. This allows the receiver to detect and correct errors in the transmission without having to request the retransmission of data.

As used herein, the term "local oscillator" or "LO" means an electronic device used to generate a signal for the purpose of converting a signal to a different frequency.

As used herein, the term "Low Density Parity Check" or "LDPC" means a linear error correction code used for transmitting messages that can withstand noisy transmission signals.

As used herein, the term "Low Noise Amplifier" or "LNA" means an electronic amplifier that is used to amplify very weak signals.

As used herein, the term "Low Pass Filter" or "LPF" means an electronic filter that passes low-frequency signals but reduces the amplitude of signals with frequencies higher than the cutoff frequency.

As used herein, the term "modularly configured" referrers to a component adapted to be utilized with minimal configuration or replacement of component parts as opposed to replacement of an entire system.

As used herein, the term "phase lock loop" or "PLL" means a control system which generates an output signal that uses a negative phase feedback technique for extracting a coherent frequency relative to an input signal.

As used herein, the term "prequalified system" means a system, deck, circuit board or component which conforms to a prequalification process. For example, a deck or a component on a deck may be prequalified.

As used herein the term "radio frequency (RF) to baseband analog mixer" means a device that creates a new radio frequency signal from two or more incoming signals from two different radio frequencies.

As used herein, the term "radio frequency (RF) baseband filter" means a device that performs the signal processing function of removing radio frequencies outside of a specified range for the purposes of enhancing the quality of desired radio frequencies.

As used herein the term "radio frequency (RF) to baseband analog mixer" means a device that creates a new radio frequency signal from two or more incoming signals from two different radio frequencies.

As used herein, the term "receiver" means hardware configured for receiving telemetry data transmissions.

As used herein, the term "S-band carrier" means a carrier of radio frequencies between 2 and 4 GHz.

As used herein, the term "up-convert" means to convert a lower frequency signal to a higher frequency.

As used herein, the term "uplink components" refers to filters, synchronizers, error-checking processing components, general packet processing components, or any processing components that can interface from a ground computer to a flight computer.

As used herein, the term "X-band" means a segment of the microwave radio region of the electromagnetic spectrum ranging from 8-10 GHz.

DETAILED DESCRIPTION OF INVENTION

For the purpose of promoting an understanding of the present invention, references are made in the text to exemplary embodiments of a telemetry system which utilizes interchangeable prequalified decks and associated components, only some of which are described herein. It should be understood that no limitations on the scope of the invention are intended by describing these exemplary embodiments. One of ordinary skill in the art will readily appreciate that alternate but functionally equivalent components, materials, and placement may be used. The inclusion of additional elements may be deemed readily apparent and obvious to one of ordinary skill in the art. Specific elements disclosed herein are not to be interpreted as limiting, but rather as a basis for the claims and as a representative basis for teaching one of ordinary skill in the art to employ the present invention.

It should be understood that the drawings are not necessarily to scale; instead, emphasis has been placed upon illustrating the principles of the invention. In addition, in the embodiments depicted herein, reference numerals in the various drawings refer to identical or near identical structural elements.

Moreover, the terms "substantially" or "approximately" as used herein may be applied to modify any quantitative representation that could permissibly vary without resulting in a change in the basic function to which it is related.

FIG. 1 illustrates an exemplary embodiment of stackable telemetry circuit board 100 comprised of a plurality of interchangeable decks. A "deck" is a structure or housing for mounting a circuit board and integrated components, which may allow for one or more circuit boards and associated components to be operatively coupled, thus integrating functionality. More specifically, a deck may be used to house multiple prequalified parts, or the deck itself may be qualified in its entirety. In the embodiment shown, each deck may house components which relate to a specific functionality, and may further be used to physically position processing components so that they can be physically replaced or interchanged without requiring an entirely new processor to be configured.

In the embodiment shown, stackable telemetry circuit board 100 includes receiver deck 15, processor deck 25, transmitter deck 35, and power supply deck 45 which each perform their respective function. Decks 15, 25, 35 and 45 are arranged and operatively coupled in a vertically stacked configuration. Other embodiments may include more or fewer decks, and in still other embodiments decks may be constructed to be operationally coupled in a non-vertical or other physical configuration.

In the embodiment shown, receiver deck 15 is modularly configured to receive data signals from a ground station transmitter. Processor deck 25 is modularly configured to convert the signal based on command and data handling. In the embodiment shown, transmitter deck 35 is modularly configured to transmit a signal and power supply deck 45 provides power and is modularly configured to regulate, control, and supply different power levels to the different decks.

Figure 2:
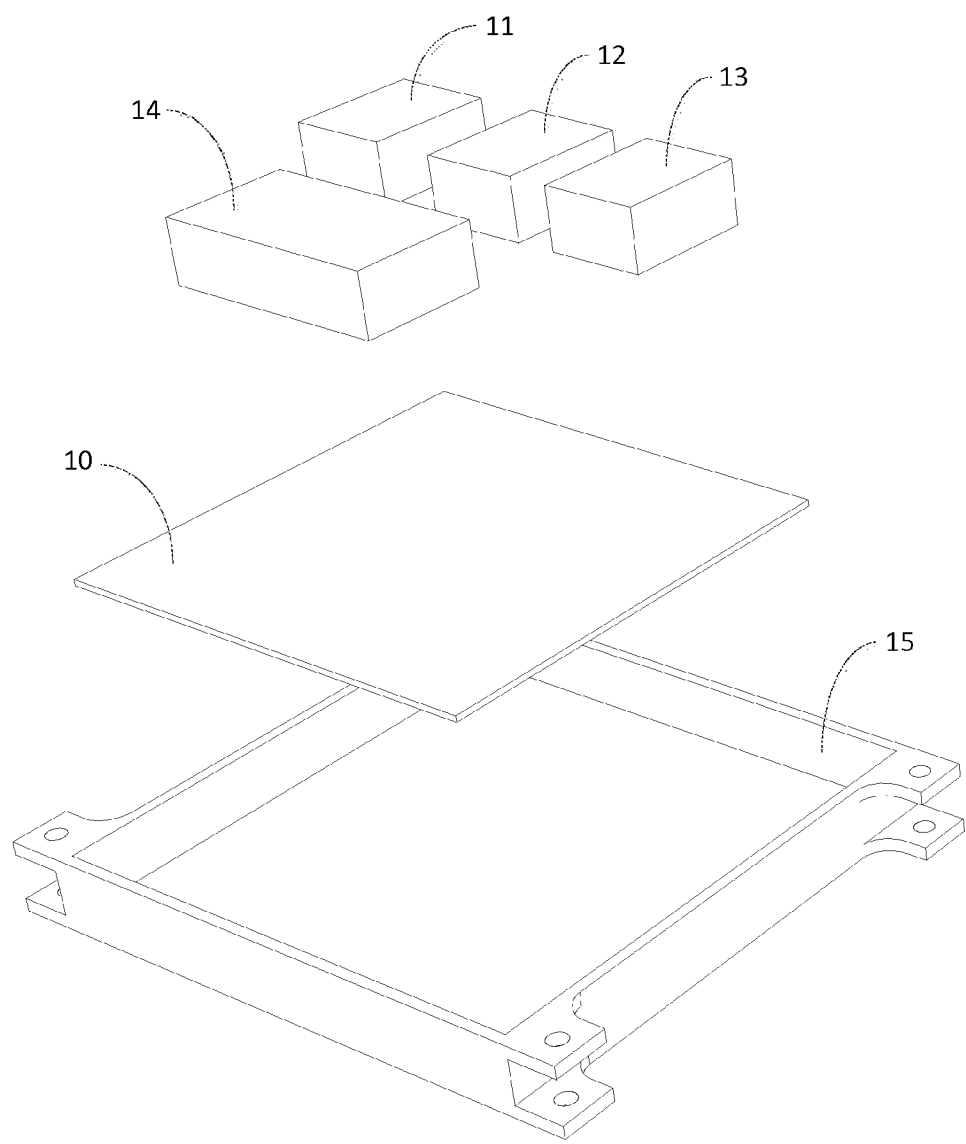
FIG. 2 illustrates an exemplary embodiment of a receiver deck for a stackable telemetry circuit board.

FIG. 2 illustrates an exemplary embodiment of receiver deck 15 for stackable telemetry circuit board 100 (shown in FIG. 1). In the embodiment shown, receiver deck 15 is modularly configured to receive a signal from a ground transmitter and is comprised of circuit board 10 with critical components receiver (RCVR) 11, down convert and low pass filter (LPF) 12, Costas loop (or analog-to-digital converter) 13, and local oscillator 14. In the embodiment shown, receiver 11 may operate at levels down to −115 dBm at 2-2.4 GHz and less than 1 decibel of Noise Figure (NE).

In various embodiments, receiver deck 15 may also include a phase lock loop (PLL), a low noise amplifier, an RF to baseband analog mixer or an RF baseband filter or any combination thereof.

Figure 3:
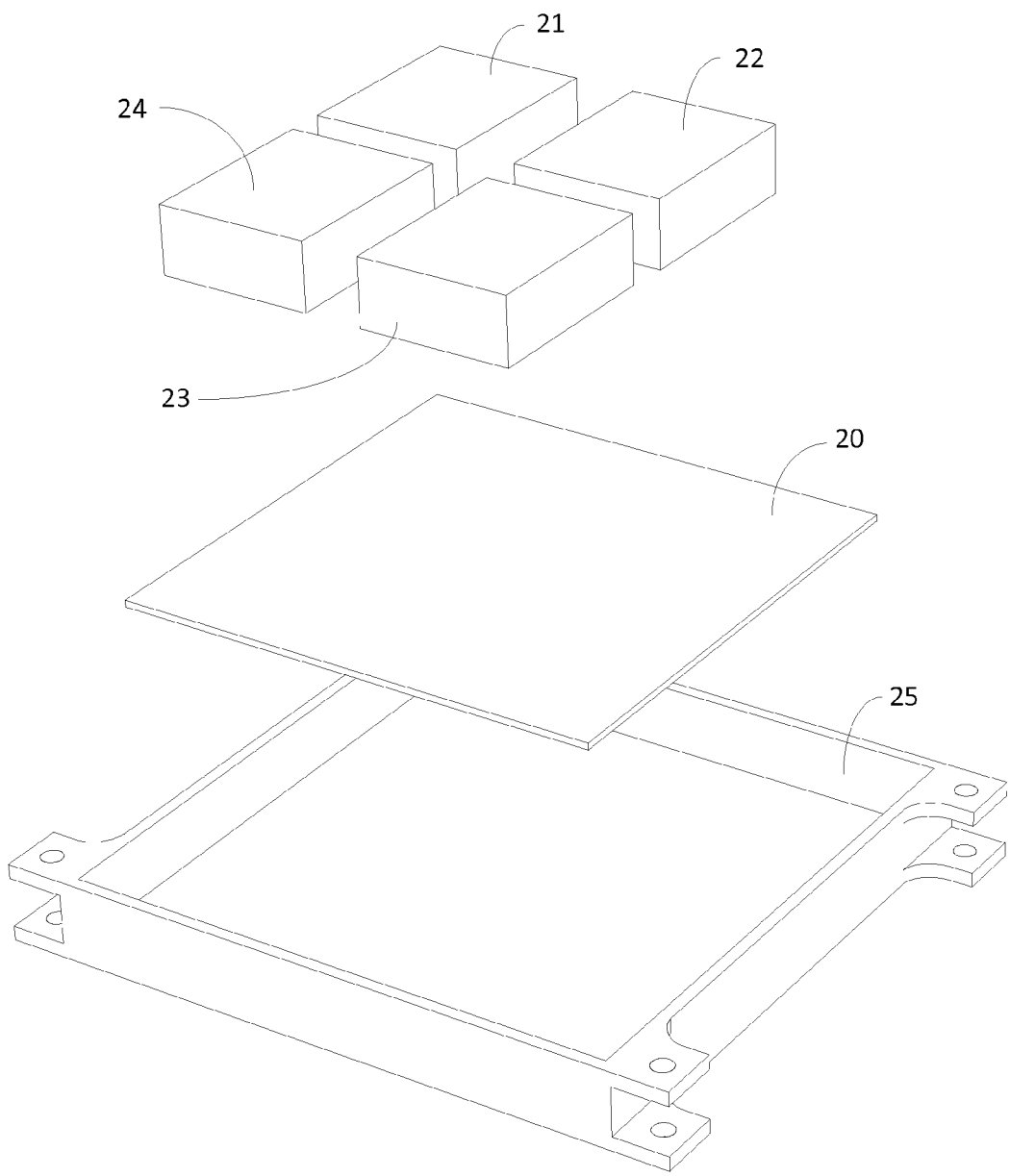
FIG. 3 is an exemplary embodiment of a processor deck for stackable telemetry circuit board.

FIG. 3 is an exemplary embodiment of processor deck or ARM-forward error correction and field programmable gate array (FPGA) deck 25. In the embodiment shown, processor deck 25 is comprised of circuit board 20 with critical components digital signal processor (DSP) 21, bit sync data recovery component 22, data formatting component 23 and low density parity check (LDPC) 24. In other embodiments, an application specific integrated circuit (ASIC) may be used to perform Reed Solomon forward error correction. In other embodiments, processor deck 25 may include at least one FPGA configured with BCH (error detection) or Pseudo-Randomization protocols. The FPGA may also perform telemetry uplink and telemetry downlink processes. In these embodiments, the FPGA may include uplink components such as filters, synchronizers, error checking components, general packet processing components or an interface to flight computer. In other embodiments, uplink component may be hardware, software or firmware. In the embodiment shown, uplink operates at 2073.38 MHz. In various other embodiment, uplink may be reconfigured during use to operate at a different frequency throughout the S-band (2-2.4 GHz) range.

Further, in other embodiments, the FPGA may also include a downlink component such as an interface to a flight computer, forward error correction or additional packet processing software components such as encryption. Likewise, the downlink component may be hardware, software or firmware.

Figure 4:
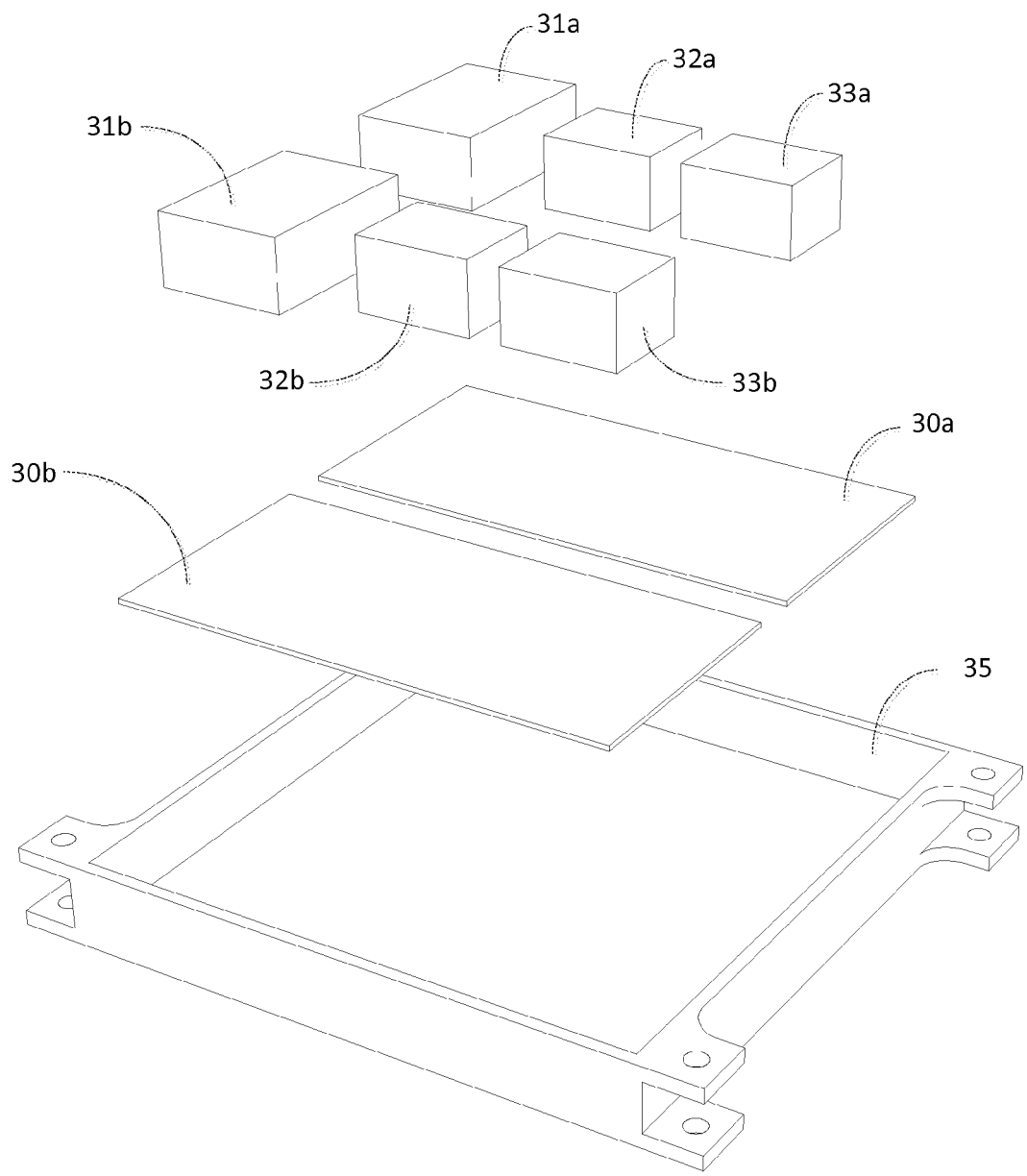
FIG. 4 is an exemplary embodiment of a transmitter deck for a stackable telemetry circuit board.

FIG. 4 is exemplary embodiment of transmitter deck 35 with which is comprised of two individual circuit boards, 30a and 30b. Circuit boards 30a and 30b include critical components transmitters 31a and 31b, up-converts 32a and 32b, and low pass filters 33a and 33b. In other embodiments, transmitter deck 35 may contain a single transmitter or more than two transmitters. In the embodiment shown, transmitter deck 35 mixes the incoming signal from processor deck 25 with an S-band and X-band carrier.

In the embodiment shown, transmitter 31a may operate at 30 dBm (1W), 2 GHz (S-band), and NF<5 dB while transmitter 31b may operate at 30 dBm (1W), 8 GHz (X-band), and NF<5 dB. In other embodiments, transmitter deck 35 may include a plurality of resister components such as analog integrated circuits, resistors, capacitors, inductors or transmitters.

Figure 5:
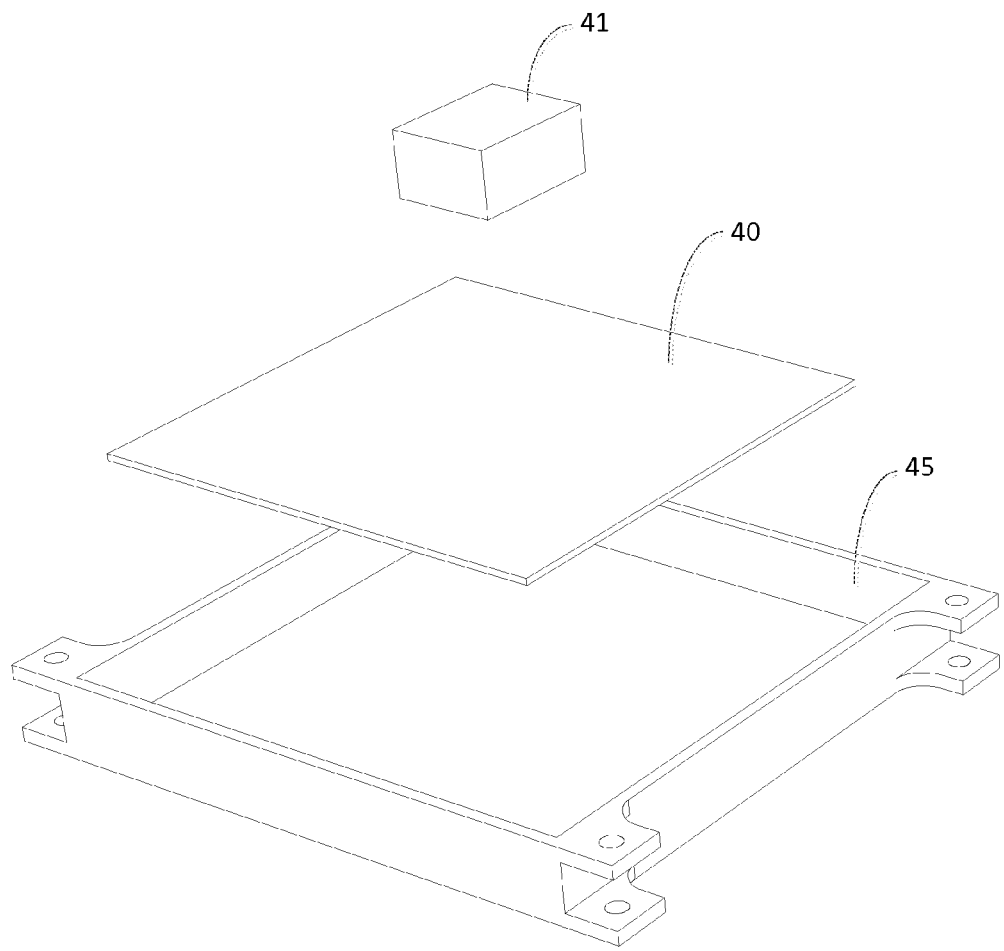
FIG. 5 is an exemplary embodiment of a power supply deck for a stackable telemetry circuit board.

FIG. 5 is an exemplary embodiment of power supply deck 45. In the embodiment shown, the bottom deck, power supply deck 45, includes circuit board 40 and includes critical component DC-DC converter 41. In other embodiments, DC-DC converter 41 may also include an EMI filter. In the embodiment shown, power supply deck 45 is modularly configured to supply power to the various decks and may increase or decrease power levels by 15 volts.

In various embodiments, power supply deck 45 may also include a voltage regulator.

Figure 6:
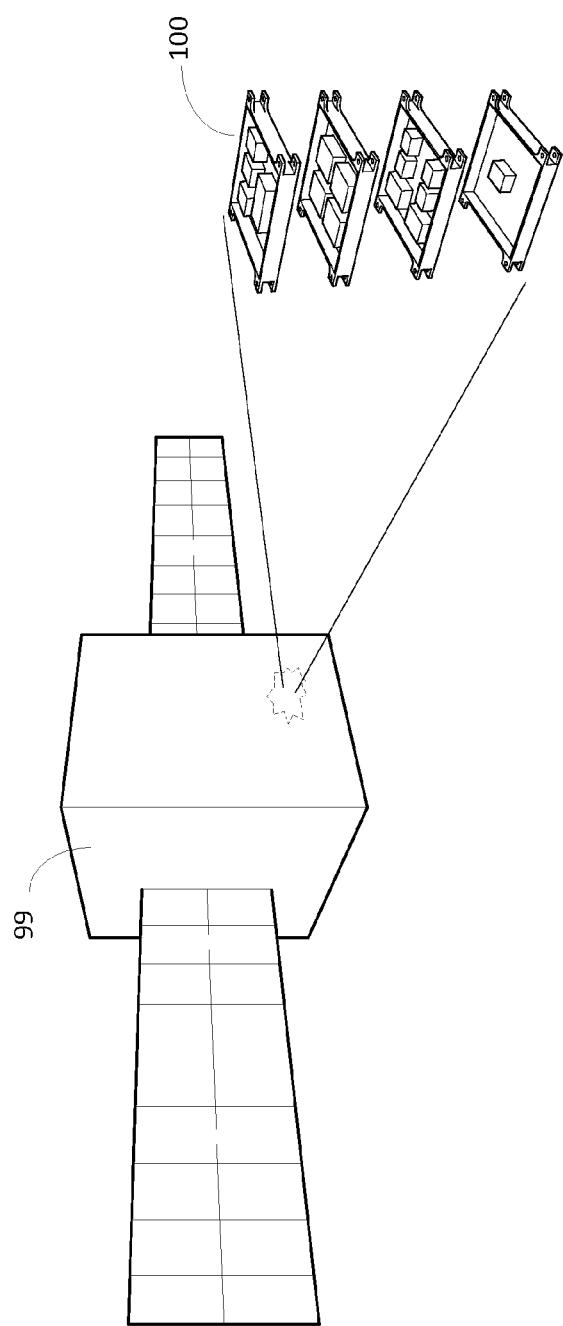
FIG. 6 is an exemplary embodiment of satellite that uses a stackable telemetry circuit board.

FIG. 6 is an exemplary embodiment of telemetry circuit board 100 in use with satellite 99. Stackable telemetry circuit board 100 is comprised of a plurality of decks and integrated components.

What is claimed is:

1. A modularly constructed telemetry transponder apparatus comprising:
   at least one modularly interchangeable telemetry receiver deck;
   at least one modularly interchangeable telemetry processor deck operatively coupled to said at least one modularly interchangeable telemetry receiver deck;
   at least one modularly interchangeable telemetry transmitter deck operatively coupled to said at least one modularly interchangeable telemetry processor deck; and
   at least one modularly interchangeable telemetry supply deck operatively coupled to said at least one modularly interchangeable telemetry transmitter deck,
   wherein all components on said receiver deck, said processor deck, said transmitter deck and said supply deck are selected from a group consisting of prequalified components.

2. The apparatus of claim 1 wherein said power supply deck includes a DC-DC converter and an EMI Filter.

3. The apparatus of claim 1 which further includes a voltage regulator.

4. The apparatus of claim 3 wherein said voltage regulator is configured to independently vary the power levels of said receiver deck, said processor deck, said transmitter deck and said supply deck decks.

5. The apparatus of claim 1 wherein said receiver deck includes a receiver.

6. The apparatus of claim 5 wherein said receiver is configured to operate at levels down to −115 dBm at 2-2.4 GHz and less than 1 decibel of Noise Figure.

7. The apparatus of claim 1 wherein said at least one receiver deck further includes a low pass filter.

8. The apparatus of claim 1 wherein said at least one receiver deck is configured with software to perform a phase lock loop.

9. The apparatus of claim 8 wherein said phase lock loop is Costas loop.

10. The apparatus of claim 1 wherein said at least one receiver deck includes an analog-to-digital converter.

11. The apparatus of claim 1 wherein said at least one receiver deck includes a local oscillator.

12. The apparatus of claim 1 wherein said at least one receiver deck includes at least one down converter.

13. The apparatus of claim 1 wherein said at least one receiver deck further includes at least one component selected from the group consisting of a low noise amplifier, a docking component, an RF to baseband analog mixer and an RF baseband filter.

14. The apparatus of claim 1 wherein said transmitter deck includes two transmitters which operate at different frequencies.

15. The apparatus of claim 14 wherein at least one of said transmitters is configured to operate at 30 dBm (1W), 2 GHz (S-band), and at less than 5 decibels noise figure.

16. The apparatus of claim 14 wherein at least one of said transmitters is configured to operate at 30 dBm (1W), 8 GHz (X-band), and at less than 5 decibels noise figure.

17. The apparatus of claim 1 wherein said transmitter deck includes at least one low pass filter.

18. The apparatus of claim 1 wherein said transmitter deck includes a plurality of resister components selected from the group consisting of analog integrated circuits, resistors, capacitors, inductors, transmitters and combinations thereof.

19. The apparatus of claim 1 wherein said transmitter deck is configured to mix an incoming data stream with an S-band carrier.

20. The apparatus of claim 1 wherein said processor deck includes a digital signal processor.

21. The apparatus of claim 1 wherein said processor deck includes a low density parity check.

22. The apparatus of claim 1 wherein said processor deck includes a bit sync data recovery component.

23. The apparatus of claim 1 wherein said processor deck includes a data formatting component.

24. The apparatus of claim 1 wherein said processor deck includes at least one field programmable gate array (FPGA).

25. The apparatus of claim 24 wherein said FPGA is configured with at least one Forward Error Correcting (FEC) protocol.

26. The apparatus of claim 25 wherein said at least one FEC is a low density parity check.

27. The apparatus of claim 24 wherein said FPGA performs telemetry uplink and telemetry downlink processes.

28. The apparatus of claim 24 wherein said FPGA includes at least one uplink component.

29. The apparatus of claim 28 wherein said at least one uplink component is selected from the group consisting of filters, synchronizers, error checking components, general packet processing components, an interface to a flight computer and combinations thereof.

30. The apparatus of claim 28 wherein said uplink component is selected of the group consisting of hardware, software, firmware and combinations thereof.

31. The apparatus of claim 24 wherein said FPGA includes at least one downlink component.

32. The apparatus of claim 31 wherein said at least one downlink component is selected from the group consisting of an interface to a flight computer, forward error correction, additional packet processing software components, encryption software such as encryption, and combinations thereof.

33. The apparatus of claim 31 wherein said at least one downlink component is selected from the group consisting of hardware, software, firmware and combinations thereof.

* * * * *